Feb. 3, 1953
G. C. MacDONALD
2,627,160
ROCKET IGNITER
Filed April 1, 1947
2 SHEETS—SHEET 1
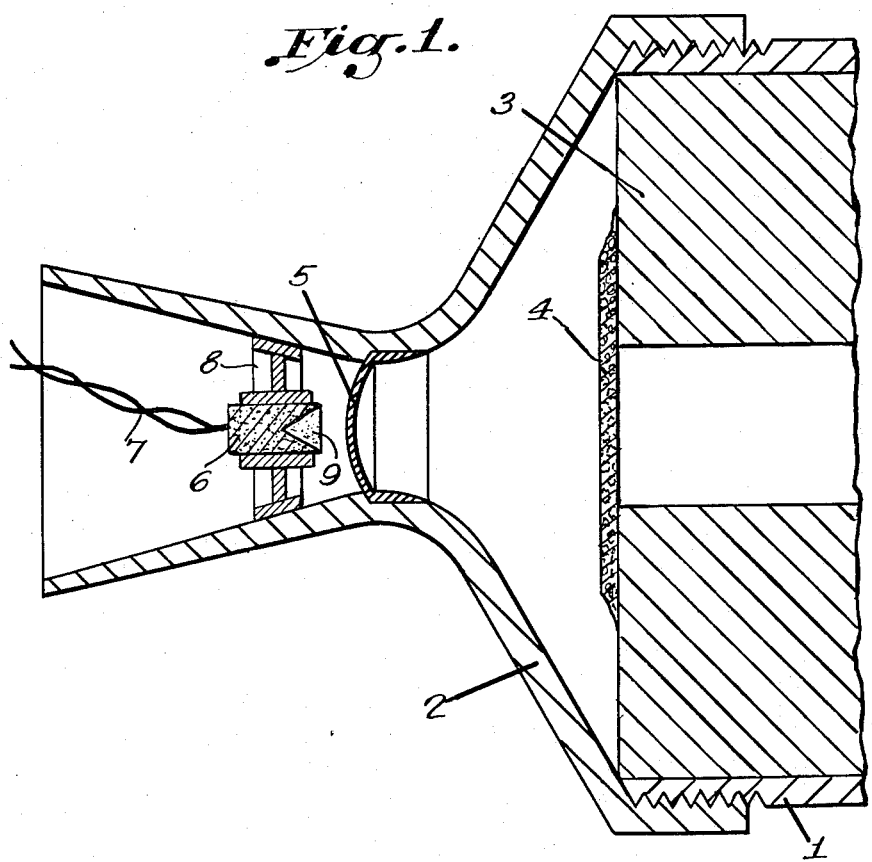
INVENTOR.
Gilman Craig MacDonald Feb. 3, 1953　　　　G. C. MacDONALD　　　　2,627,160
ROCKET IGNITER
Filed April 1, 1947　　　　　　　　　　2 SHEETS—SHEET 2
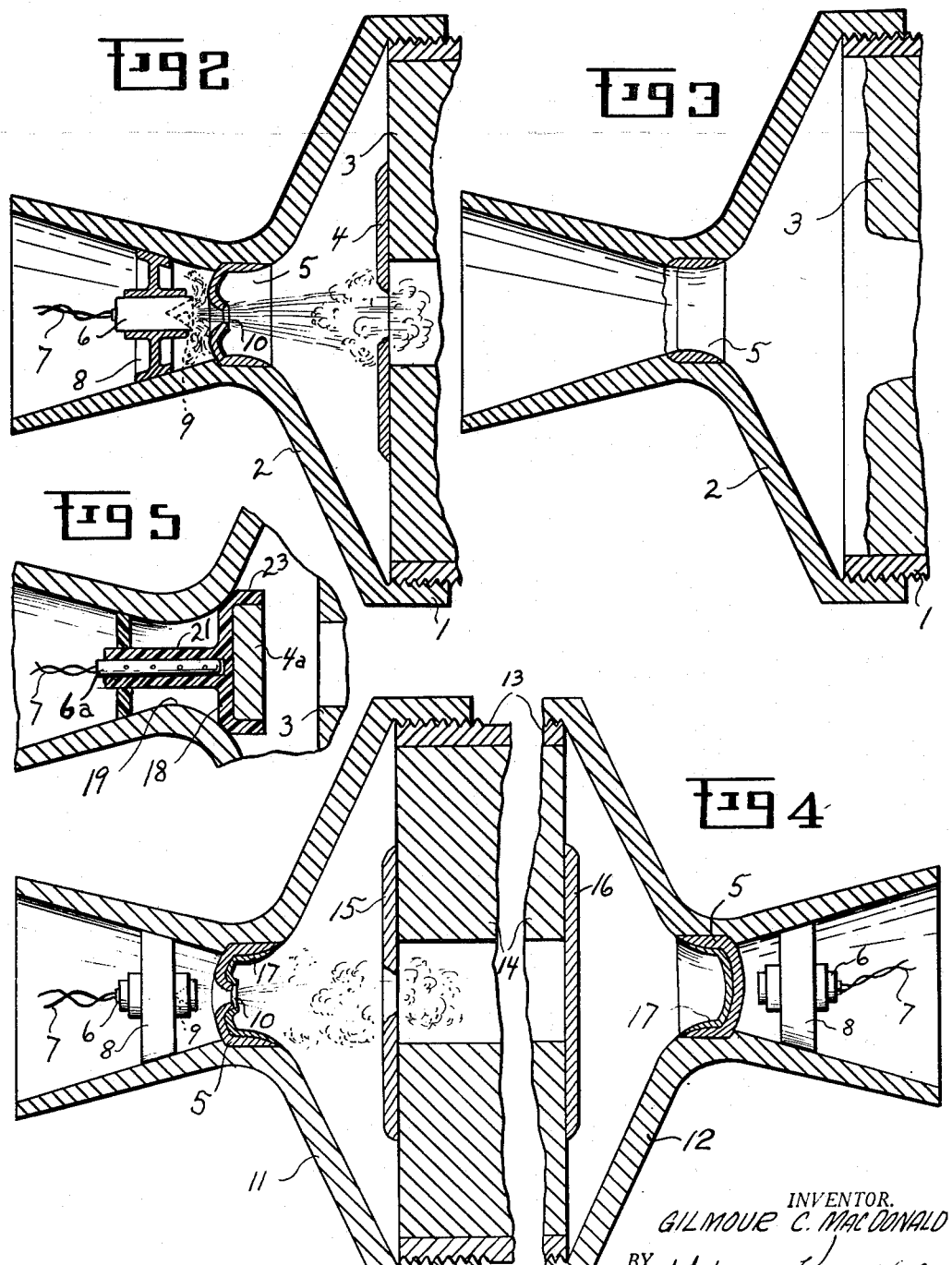
INVENTOR.
GILMOUR C. MacDONALD
BY
ATTORNEYS

Patented Feb. 3, 1953

2,627,160

UNITED STATES PATENT OFFICE 2,627,160

ROCKET IGNITER

Gilmour Craig MacDonald, Ames, Iowa

Application April 1, 1947, Serial No. 738,601

4 Claims. (Cl. 60—35.6)

(Granted under Title 35, U. S. Code (1952), sec. 266)

This invention described herein may be manufactured and used by or for the Government for governmental purposes, without the payment to me of any royalty thereon.

This invention relates to rocket igniting means and more particularly to simple means for igniting the main rocket propellant charge coincidentally with venting the propellant chamber.

It is an object of this invention to provide means whereby an explosive charge, employed to rupture the nozzle closure of a rocket, also ignites the main propellant charge.

It is a further object of the invention to simplify solid fuel rockets, of the type providing for optional direction of thrust through the use of dual or multiple nozzles, by utilizing two or more of the rocket igniting means herein disclosed in substitution for the conventional rocket firing means.

Certain important advantages in improving the low temperature ignition characteristics of rocket thrust units accrue to this invention in that the explosive rupturing charge and the nozzle closure means may be so designed that the rupturing charge produces only a small hole in the closure, the balance of the closure blowing and/or eroding out of the nozzle only when the pressure within the rocket chamber approaches the normal operating pressure. By this means, the ratio of propellant burning surface to nozzle area may be increased during the critical ignition period, which will substantially improve ignition of the propellant, especially at low temperatures.

A further advantage of this invention is that the rocket unit may remain permanently and hermetically sealed after manufacture, and the initiating charge may be inserted in the exterior portion of the nozzle. This is in contrast with the present system of inserting an internal igniter prior to use, which may cause serious internal effects due to excessive humidity, or the hazardous practice of handling and shipping the unit with the igniter in place and with the firing circuit wires attached.

Other objects and advantages of this invention will be apparent during the course of the following description, reference being made to the attached drawing wherein:

Figure 1 depicts a longitudinal section view of a portion of a rocket thrust unit embodying my invention. Figure 2 is a section view similar to Figure 1 but depicting the detonation of the rupturing charge and the resultant rupture of the blowout element. Figure 3 is a section view similar to Figure 2 but depicting the condition of the blowout element when the rocket is at the normal operating pressure. Figure 4 is a longitudinal sectional view of a dual nozzle type of rocket motor illustrating the application thereto of the rocket igniting means of the invention. Figure 5 is a longitudinal sectional view of a portion of a rocket thrust unit embodying a modified form of closure.

Tube 1 is screwed into nozzle 2 forming the combustion chamber confining propellant 3 and igniter 4. Blowout element 5 is secured in the nozzle at the inner or chamber end of the latter in spaced relation to the propellant as shown and effects closure of the nozzle 2 until such time as rupturing charge 6 is detonated by an electrical current passing through the conductor 7 of the firing circuit (not shown). The rupturing charge 6 is positioned and supported substantially at the axial center of the nozzle 2 by means 8, which may be a spider or other conventional structure. Closure element 5 as presently shown is a cup-shaped member placed in the nozzle as shown and designed to fail at pressures in excess of the normal operating pressure but less than the determined bursting pressure of the combustion chamber.

The detonation of rupturing charge 6 (which may or may not employ the "hollow charge" shape shown) ruptures the blowout element 5, the incandescent particles from said detonation and rupture travelling almost instantaneously to the igniter 4 which ignites the propellant 3 in the usual manner. In the practical application of the invention, the rupturing charge may, if desired, be so proportioned as to quantity, size, etc., that the blasting or explosive effect thereof will substantially disintegrate and destroy its associated closure or blowout element. Improvement in the low temperature ignition characteristics of the rocket is obtainable, however, if the charge is shaped to have a rupturing force effective to produce only a small vent hole in the closure means. The results achieved from the use of a shaped charge are apparent from Figures 1 and 2 wherein is shown a rupturing member of the "hollow charge" shape comprising a right cylinder 6 of explosive having a conical cavity 9 in one end and supported within the nozzle 2 and near the outer face of blowout element 5 so that the base of the cone 9 faces the blowout element. The directional control and deep penetration obtainable with such a shaped charge is usually called the "cavity effect" phenomenon. The pronounced directional effect and deep penetration which is obtainable with a right cylinder of explosive having a conical cavity in one end have long been known in the art and the phenomenon is some times referred to as the "Monroe effect" as a result of the investigation and studies made by Monroe in the United States. Additional information regarding this phenomenon and the investigations by Monroe and others will be found on page 18 of the work by Colonel Leslie E. Simon, United States Army, entitled, "German Research in World War II" and published in 1947 by John Wiley & Sons, Inc., New York. Figure 2 of the drawings depicts the device at the instant of detonation of the rupturing charge 6 which, by reason of the "cavity effect" phenomenon referred to above, projects a thin tongue or jet of incandescent gas under extreme pressure which ruptures and pierce the blowout element as shown at 10. Incandescent gas and metal particles from the detonated charge and the ruptured element travel to and strike the igniter 4 which flares up, igniting the propellant 3 in the usual manner. Figure 3 illustrates the condition of the parts following a short period of time after the rocket unit has reached normal operating pressure. At this phase of the operation, the propellant 3 is burning on all exposed surfaces and the nozzle passage is substantially clear of all obstructions; the blowout element 5 having been blown and/or eroded flush with the internal nozzle surface by the high temperature and pressure of the gases of combustion. During the critical ignition period occurring between the respective conditions illustrated in Figures 2 and 3, the ratio of propellant burning surface to nozzle area is substantially increased with the result that the continued ignition of the propellant, particularly at low temperatures, is materially promoted and improved.

The assembly of blowout element and rupturing charge shown in Figures 1 and 2 is designed primarily for use with a rocket of the unidirectional or single nozzle type. With a single rocket of the dual or multiple nozzle type, two or more assemblies of blowout element and rupturing charge are used to give a choice of thrust direction of the rocket. This is illustrated in Figure 4 wherein is shown a rocket thrust unit of the dual nozzle type comprising a rocket body having oppositely disposed nozzles 11 and 12 connected with a common propellant chamber 13 containing the propellant 14 and the propellant igniters 15 and 16. Each nozzle is shown provided with a closure of the type illustrated in Figure 1 and including a blowout element 5, rupturing member 6 of the "hollow charge" shape, detonating wires 7, and charge-supporting means 8. Thrust in the desired direction is obtained by detonating the rupturing charge in the selected nozzle for igniting the propellant coincidently with venting the nozzle. In Figure 4, the blowout element 5 of nozzle 11 is shown ruptured and the propellant 14 ignited by detonation of its associated charge 6 while the blowout element 5 of the nozzle 12 is shown intact. It is essential to the maintenance of the direction and duration of the thrust that failure of the blowout element of the non-vented nozzle should not occur during the operating period of the rocket. It is obvious, therefore, that each nozzle closure or blowout element used in a rocket giving a choice of thrust direction must be able, while in its non-ruptured condition, to stand normal chamber pressures without failure and at the same time be protected against the high temperature of the gases of combustion. Accordingly, the blowout element 5 is made of such material and design herein disclosed as to withstand pressures in the propellant chamber in excess of the normal operating pressures but less than the determined bursting pressure of the propellant chamber. In addition, a protective shield 17 of any suitable heat insulating material is used with the blowout element 5 to insulate the element from the heat of the hot gases of the combustion chamber. This insulating material may be applied, as shown in Figure 4, as a covering layer upon the side of the element facing the igniter and the propellant. Upon rupture of the blowout element by detonation of the shaped explosive charge, its associated insulator is also ruptured by the jet formation of the blast which travels to and ignites the propellant igniter. In the operation of the dual-nozzle rocket thrust unit shown in Figure 4, when the blowout element 5 of nozzle 11 is vented to give the desired direction of thrust, the blowout element 5 of nozzle 12 is left intact for the duration of the thrust unless cancellation or neutralization of thrust is desired, in which case it is ruptured by detonation of its associated rupturing charge 6 to vent the nozzle 12 for setting up a counter thrust. Hence, while one nozzle of the dual nozzle rocket is in operation to give the desired direction of thrust, the other nozzle provides auxiliary venting means which is operable under manual direction to vent the propellant chamber to control the duration of the thrust and operable also in response to propellant chamber pressure to automatically vent the propellant chamber before pressures in the chamber in excess of the normal operating pressure reach bursting pressure.

Many other types of closures are also applicable to this invention. A modified form of closure is illustrated in Figure 5. The closure or blowout element therein depicted is preferably of moulded plastic and has a main body or plug 18 which is seated in the nozzle 2 at the inner or propellant chamber side of the throat or restricted portion 19 of the nozzle, in spaced relation to the propellant 3, and closes the nozzle passageway in the manner shown. Plug 18 is retained in its nozzle-closing position in any conventional and suitable manner (not shown) and has a hollow stem 21 which is an integral part of the plug. The stem 21 is on the outer face of the plug and extends longitudinally of the nozzle from the plug to the outer or far side of the nozzle throat 19, the diameter of the stem being so much less than the diameter of the nozzle throat that the stem is substantially spaced from and centered between the encompassing wall of the nozzle. The hollow stem 21 carries the cylindrical rupturing charge 6a which is placed in the bore or cavity 22 of the stem. A cup 23 on the inner face of plug 18 provides a receptacle for the igniter 4a which may be pelleted in place or retained as a powder by any conventional retaining means, i. e., a foil covering. This type of closure serves as a carrier for both the closure rupturing charge 6a and the propellant igniter 4a. Closure 18 may also be designed so that the rupturing charge leaves a portion of the closure intact until the rocket approaches the normal operating pressure when the closure is broken up and expelled.

It will be understood that the scope of this invention is not limited to the exemplary structure illustrated and specifically described, but is limited only by the scope of the following claims.

I claim:

1. In a rocket thrust device, the combination of a propellant, a combustion chamber confining the propellant and having an outlet nozzle, a rupturable blowout element secured in the nozzle at the inner or chamber end of the latter in spaced relation to the propellant and closing the nozzle at such end, a propellant igniter between the said element and the said propellant, means for rupturing the said element and igniting the propellant igniter including a charge of explosive within the nozzle, said explosive being of the "hollow charge" shape comprising a right cylinder of explosive having a conical cavity in one end and supporting means for the said charge positioned in the nozzle adjacent the outer side of the blowout element and supporting the said charge substantially spaced from and centered between the encompassing wall of the nozzle with the base of the cone facing the blowout element.

2. In a rocket thrust device, the combination of a propellant, a combustion chamber confining the propellant and having multiple outlet nozzles angularly disposed to give a choice of direction of thrust, a blowout nozzle closure in each nozzle and closing the same, a propellant igniter between the propellant and each nozzle closure, and means operatively associated with each nozzle for blowing out the nozzle closure and igniting the propellant igniter, said means including a charge of explosive within the nozzle and adjacent the outer side of the nozzle closure.

3. In a rocket thrust device, the combination of a propellant, a combustion chamber confining the propellant and having two or more outlet nozzles angularly disposed to give a choice of direction of thrust, a rupturable blowout element in each nozzle at the inner or chamber end of the nozzle and closing the nozzle at such end, a propellant igniter between the propellant and each rupturable blowout element, and means operatively associated with each nozzle for rupturing the element and igniting the propellant igniter, including a shaped charge of explosive material within the nozzle and adjacent the outer side of the blowout element.

4. In a rocket thrust device, the combination of a propellant, a combustion chamber confining the propellant and having multiple outlet nozzles angularly disposed to give a choice of direction of thrust, a blowout nozzle closure in each nozzle and closing the same, said closure being formed of a material having sufficient physical strength to remain intact at combustion chamber pressure in excess of the normal operating pressure but less than the determined bursting pressure of the combustion chamber, a propellant igniter between the propellant and each nozzle closure, a closure protective shield of heat-insulating material positioned between each nozzle closure and propellant igniter, and means operatively associated with each nozzle for blowing out the nozzle closure and igniting the propellant igniter, said means including a charge of explosive within the nozzle and adjacent the outer side of the nozzle closure.

GILMOUR CRAIG MacDONALD.

REFERENCES CITED

The following references are of record in the file of this patent:

UNITED STATES PATENTS

| Number | Name | Date |
|---|---|---|
| 40,092 | Dibble | Sept. 29, 1863 |
| 2,423,837 | Martin | July 15, 1947 |
| 2,455,015 | Mace | Nov. 30, 1948 |
| 2,457,839 | Skinner | Jan. 4, 1949 |

FOREIGN PATENTS

| Number | Country | Date |
|---|---|---|
| 330,493 | Great Britain | June 12, 1930 |
| 864,822 | France | Feb. 3, 1941 |